Jan. 24, 1961 L. R. MANONI 2,968,944
PERFORATED TEST SECTION WALLS FOR WIND TUNNELS
Filed June 11, 1958

INVENTOR.
LAWRENCE R. MANONI
BY
ATTORNEYS

United States Patent Office 2,968,944
Patented Jan. 24, 1961

2,968,944

PERFORATED TEST SECTION WALLS FOR WIND TUNNELS

Lawrence R. Manoni, Wethersfield, Conn., assignor to the United States of America as represented by the Secretary of the Air Force Filed June 11, 1958, Ser. No. 741,434

7 Claims. (Cl. 73—147)

The present invention relates to perforated test section walls for wind tunnels and, more particularly, to a new design for the configuration of the perforations of these walls.

In the construction and operation of wind tunnels at transonic and supersonic speeds, many problems arise in obtaining and recording error-free test data. One of these more acute problems is the bounce or reflection of the shock wave, which interferes seriously with the accuracy of the test data obtainable. At supersonic speeds the shock wave may bounce at an angle which carries it to the rear of the test object, where it will not be an interfering factor. Under some conditions, however, particularly in the transonic speed range, the condition arises where the shock wave is reflected back at such an angle that it will strike the test object and interfere with the accuracy of the desired data. It has been found that the boundary layer or partially stagnant layer lying along the chamber wall is in large measure responsible for the echo wave, and further responsible for modifying it. That is, the characteristics of the shock wave are modified when they enter the boundary layer so that the point of wall contact, the angle of incidence and the angle of reflection of the echo wave are so modified that they cannot be accurately predicted or determined. Where and if the shock wave will reflect back to the test model cannot be accurately predicted.

There has been much experimentation and many theoretical studies in attempts to meet and solve these problems. One of these was a perforated wall with simple perpendicular holes for drawing off a portion of the boundary layer. These were later replaced by slanted holes, which were found to have improved cross-flow characteristics, and were superior to normal-hole plates for obtaining interference-free data. However, an additional problem arose when slanted holes were used. Photographic records, which are made by such devices as Schlieren and interferometer apparatus, are located outside of the test section. Sufficient viewing for Schlieren purposes could only be obtained through the normal-hole plates. When these holes were slanted for the purpose of obtaining more favorable cross flow characteristics, the most successful results were obtained where the pitch or angle of the hole was of the order of 60° and therefore, so steep as to cut off or materially reduce the line of view altogether.

An object of the present invention is to produce a perforated plate for use in the test section of transonic and supersonic wind tunnels which provides the advantageous cross flow characteristics of slanted holes and at the same time provides the unobstructed view across the wind tunnel test section for multisource Schlieren pictures which was obtainable in a normal-hole plate.

A further object of the invention is to provide a multi-hole configuration as described above with suitable cross flow characteristics and maximum view across the test section for a multiple source Schlieren apparatus.

More specifically, the object of the invention is the provision of a dimpled configuration in the plate on the up-stream side of each perforation to provide both a slanted air flow area for drawing off the boundary layer and a substantial unobstructed circular area for Schlieren viewing.

Further objects and advantages of the invention will become obvious as the description proceeds.

Figure 1:
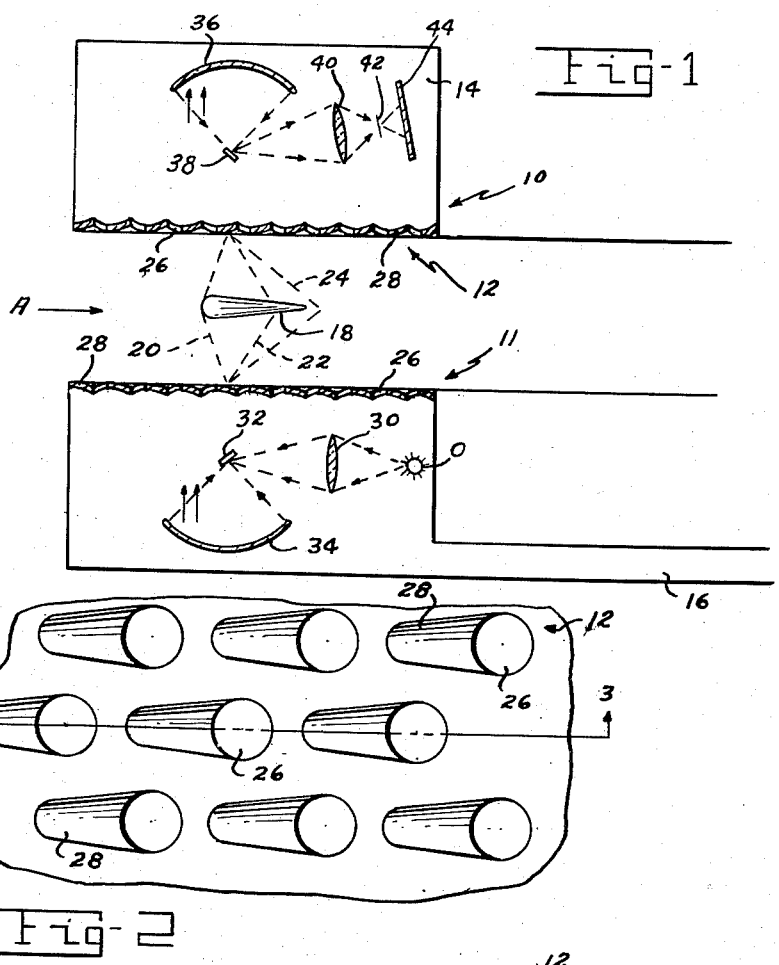
Fig. 1 is a schematic longitudinal section of a test chamber of a wind tunnel illustrating the invention.
Figure 2:
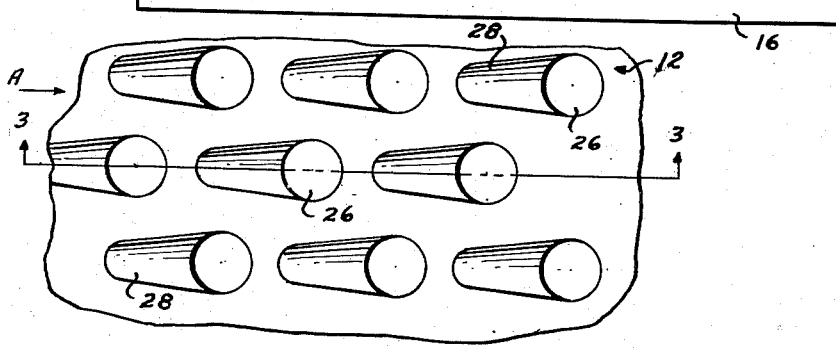
Fig. 2 is a fragmentary interior elevation of a portion of the wall of the test section embodying my invention.
Figure 3:
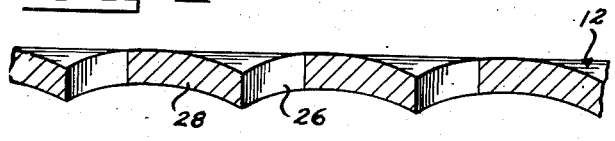
Fig. 3 is a section taken on the line 3—3 of Fig. 2.

Referring more in detail to the drawing, a wind tunnel test section is designated generally by the numeral 10. The test section is defined by a pair of plates 11 and 12, perforated to allow circulation and drawing off of the boundary layer in the wind tunnel test section. This may be accomplished by means of a chamber 14 surrounding the test section 12, and provided with a suction conduit 16 leading to an air reservoir or suction providing means (not shown).

A test object 18 is supported in the test section of the wind tunnel by means not shown. The direction of air flow is indicated by the arrow A. As the simulated conditions of transonic and supersonic speeds are reached, a shock wave, indicated schematically by the line 20, is built up by the test object 18. This shock wave, bouncing back from the boundary layer, is indicated schematically by the lines 22 and 24.

At supersonic speeds, the path of the reflected wave may not intercept the test object, but fall behind it, as represented at 24. In this condition no adverse effect on test data is experienced. However, in the transonic area the condition indicated at 22 in Fig. 1 arises where the bouncing shock wave strikes back against the test object.

It is obvious that the reflected shock wave 22, striking back against the test object will interfere seriously with the accuracy of the test results and the Schlieren picture sought. As pointed out above, many experimental attempts have been made to draw off the boundary layer, and thus reduce the amount of the interfering return wave.

The device or the means devised by the present inventor is a wall plate, or a pair of wall plates 11 and 12 installed in opposite sides of the test section, wherein the perforations through which the boundary layer is drawn off, are dimpled holes 26 presenting a smooth interior slanted surface 28 leading into the hole from the upstream side for outgoing air flow. This device has the cross flow characteristics of the slanted holes 29, shown in Fig. 4, and at the same time provide the unobstructed passage across the test section necessary for Schlieren viewing.

Figure 5:
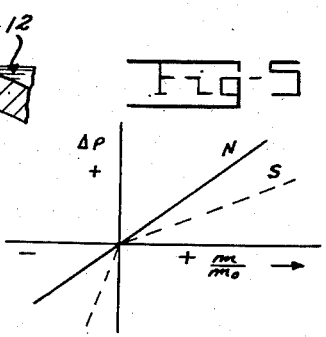
Fig. 5 is a graphic representation of comparative cross flow characteristics of normal-hole walls and slanted-hole walls.
Figure 4:
Fig. 4 is a sectional view of a conventional slanted-hole wall, for purpose of comparison.

Comparative test were made using (1) normal holes; (2) slanted holes with a pitch of the order of 60°, as shown in Fig. 4; and (3) the dimpled hole of the subject invention. Fig. 5 is graphic picture of the comparative cross flow characteristics which were obtained. The results of the tests were plotted, $\Delta P$ (pressure) as represented on the ordinate, and $$\frac{m}{m_0}$$

(where $m$ is the mass flow through the hole, and $m_0$ is the mass flow inside the tunnel) is represented on the abscissa. N represents the line plotted for the normal hole; and S the dotted line plotted for the slanted hole.

The results obtained for the dimpled hole were found to be almost identical with those made with the slanted hole tests showing that the cross flow characteristics of a 60° slanted hole and a dimpled hole as disclosed in subject invention are substantially identical. In the graphic representation in Fig. 5, $\Delta P$ is the difference between the pressure inside the test chamber and the pressure outside, i.e., the pressure differential between the inside of the wall and the outside. The $$\frac{m}{m_0}$$

ratio, or the amount of flow through the holes is dependent upon the value of $\Delta P$. The graph of Fig. 5 shows that 60° slanted holes allow greater mass flow with less pressure differential than normal holes. The cross flow characteristics of the slanted holes of Fig. 4 and dimpled holes of the invention are shown to be substantially equal.

An example of a Schlieren arrangement is shown very schematically in Fig. 1. The Schlieren arrangement forms no part of the instant invention. Therefore, the illustration given is for purposes of example only, and it is to be understood that many optical arrangements are posible. The rays of light from a source 0, located at the focal point of a lens 30 is directed onto a small mirror 32. The mirror 32 is positioned at the focus of a parabolic mirror 34. The rays of light are directed to the mirror 34, where they are columnated and directed to meet the plate 11 at right angles. If there is no test specimen in the test chamber, and no other interrupting elements, the rays follow a parallel path through the opposite perforated wall 12, where they are focused by a second parabolic mirror 36. A small mirror 38 placed at the focus of the mirror 36 directs the rays to a lens 40. A "knife edge" is shown at 42, and a viewing screen or camera, or both may be located at 40 in a conventional manner. The path of the light rays is indicated by the small arrows in Fig. 1.

When the test object is placed in the test chamber, and the wind tunnel set into operation to provide airflow around the test object, the disturbances in the path of travel of the light rays cause shadows which are recorded on the visual screen, or the photographic film as the case may be, and provide the information sought.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A wind tunnel having a test section, at least one wall for said test section comprising a plate, the interior surface of said plate being free from protuberances, means providing circular openings in said plate for drawing off boundary layer developed in said wind tunnel, a slanted area in said plate on the upstream side of each of said openings terminating in the circumferential edge of said openings and providing the opening with the cross flow characteristics of slanted holes while allowing the unimpeded viewing characteristics of normal holes.

2. A wind tunnel wall for wind tunnel test sections comprising a plate, said plate being free from protuberances on its inward surface, means providing a plurality of circular openings in said plate, a dimpled section in said plate on the upstream side of each opening and terminating in the upstream side of said opening, said dimpled section being formed by depressing the entire thickness of the material of said plate, said depressed sections providing slanted surfaces for air flow which possess the cross flow characteristics of slanted openings and at the same time provide the unobstructed normal angle view for Schlieren purposes which a circular hole would afford.

3. A wall for a wind tunnel test section comprising a plate, said plate having an inner surface free from inward protuberances, means providing vision through a plurality of circular openings in said plate, said means comprising a dimpled section depressing the entire thickness of said plate on the upstream side of said opening.

4. A supersonic wind tunnel test section, a wall for said test section comprising a plate having an inward surface entirely free from inward protuberances, means providing circular openings in said plate for drawing off boundary layer and for Schlieren viewing, a depressed semicircumferential edge partially surrounding each of said openings and located on the upstream side of each opening, a slanted area in said plate located on the upstream side of each of said openings and terminating in said semicircumferential edge, said slanted area modifying the cross flow characteristics of said opening.

5. A supersonic wind tunnel test section, a low pressure area adjacent said test section, a wall between said test section and said low pressure area, said wall comprising a plate, means for drawing off the boundary layer developed along the interior wall of said tunnel into said low pressure area, said means comprising elements providing a plurality of openings in said plate, means for modifying the cross flow characteristics of flow through said openings at the same time leaving the opening unobstructed for the purpose of Schlieren viewing, said last named means comprising a depressed circumferential edge on the upstream side of each of said openings, and a slanted area in said plate adjacent said depressed edge, and slanted generally in the direction of flow within the tunnel.

6. A wind tunnel having a test section, a wall for said test section comprising a plate, the interior surface of said plate being free from inward protuberances, means providing circular openings in said plate for Schlieren viewing and for drawing off boundary layer developed in said wind tunnel, a depressed area in said plate located on the upstream side of each of said openings, affecting the entire thickness of said plate in said depressed area, and terminating in a depressed circumferential edge of said openings thereby providing an area slanted substantially in the direction of the air flow within the tunnel, and also providing an unobstructed opening for Schlieren viewing.

7. A wind tunnel having a high velocity test section and a low pressure area adjacent said test section, a wall between said test section and said low pressure area comprising a plate, the interior surface of said plate being free from inward protuberances, means providing circular openings in said plate, a depressed area in said plate affecting the entire thickness of said plate, located on the upstream side of each of said openings, and terminating in a depressed circumferential edge of said openings, thereby providing an area adjacent each opening slanted in the direction of the air flow within the tunnel for drawing off boundary layer developed along the wall of said tunnel into the reduced pressure area, Schlieren apparatus located in said reduced pressure area, said openings in said wall affording a substantially circular unobstructed opening for Schlieren viewing.

References Cited in the file of this patent

UNITED STATES PATENTS

| D. 152,764 | Bassett | Feb. 22, 1949 |
| 2,709,917 | Bruynes | June 7, 1955 |
| 2,788,719 | Bennett | Apr. 16, 1957 |
| 2,799,161 | Greene et al. | July 16, 1957 |

OTHER REFERENCES

Article by Boden entitled "Supersonic Wind Tunnel for Testing up to 4000 MPH," found in Automotive Industries, Apr. 1, 1949, pp. 36–38.